United States Patent [19]

Martin

[11] Patent Number: 5,186,502
[45] Date of Patent: Feb. 16, 1993

[54] DOUBLE-CONTAINMENT PIPE FITTINGS AND SYSTEM

[75] Inventor: Carl E. Martin, Sand Springs, Okla.

[73] Assignee: Fibercast Company, Sand Springs, Okla.

[21] Appl. No.: 625,837

[22] Filed: Dec. 11, 1990

[51] Int. Cl.$^5$ ............................................. F16L 39/00
[52] U.S. Cl. .................................. 285/133.1; 285/138; 285/179; 138/112; 138/113
[58] Field of Search .................... 285/45, 133.1, 138, 285/417, 419, 179; 138/112, 113, 114

[56] References Cited

U.S. PATENT DOCUMENTS

| | | | |
|---|---|---|---|
| 130,216 | 8/1872 | Goodale . | |
| 447,275 | 2/1891 | Berrenberg . | |
| 578,474 | 3/1897 | Thompson et al. . | |
| 797,911 | 8/1905 | Perry . | |
| 887,850 | 5/1908 | Rollins . | |
| 1,134,930 | 4/1915 | Theriot | 285/138 X |
| 1,140,633 | 5/1915 | Trucano | 285/133.1 X |
| 1,371,632 | 3/1921 | Latimer . | |
| 1,383,680 | 7/1921 | Waldorf . | |
| 1,446,789 | 2/1923 | Dodd . | |
| 1,485,512 | 3/1924 | Le Cocq et al. . | |
| 1,737,161 | 11/1929 | Jupp . | |
| 1,853,736 | 4/1932 | Lawrence . | |
| 1,886,427 | 11/1932 | Riggins | 285/130 X |
| 1,909,075 | 5/1933 | Ricker et al. . | |
| 1,931,465 | 10/1933 | Gysling | 137/75 |
| 2,031,849 | 2/1936 | O'Leary | 285/22 |
| 2,401,974 | 6/1946 | Siebels | 138/76 |
| 2,475,635 | 7/1949 | Parsons | 285/133.1 |
| 2,478,684 | 8/1949 | Brooks | 138/97 |
| 2,613,166 | 10/1952 | Gronemeyer | 154/45 |
| 2,650,112 | 8/1953 | Kinkead | 285/22 |
| 2,696,835 | 12/1954 | Kaiser | 138/87 |
| 2,707,095 | 4/1955 | Parsons et al. | 257/241 |
| 2,745,683 | 5/1956 | Nihlen | 285/138 |
| 2,895,512 | 7/1959 | Forsyth et al. | 138/87 |
| 3,065,807 | 11/1962 | Wells | 175/321 |
| 3,143,146 | 8/1964 | Kennedy | 138/107 |
| 3,208,539 | 9/1965 | Henderson | 175/215 |
| 3,489,438 | 1/1970 | McClure | 285/133 |
| 3,503,635 | 3/1970 | Cheatwood | 285/138 |
| 3,546,356 | 12/1970 | Graybill | 174/21 |
| 3,721,270 | 3/1973 | Wittgenstein | 138/104 |
| 3,860,269 | 1/1975 | Horton | 285/153.1 |
| 3,980,112 | 9/1976 | Basham | 141/392 |
| 4,072,328 | 2/1978 | Elliott | 285/169 |

(List continued on next page.)

FOREIGN PATENT DOCUMENTS

| | | | |
|---|---|---|---|
| 3439417 | 4/1986 | Fed. Rep. of Germany | 285/45 |
| 508388 | 3/1957 | Italy | 285/45 |
| 410196 | 5/1934 | United Kingdom | 255/45 |
| 9004736 | 5/1990 | World Int. Prop. O. | 256/138 |

OTHER PUBLICATIONS

Military Standardization Handbook "Plastics"-'-MIL-HDBK-700[MR] Nov. 1, 1985 pp. 66-68.
FIG. 555, 90° Elbow Short Radius.

Primary Examiner—Dennis L. Taylor
Assistant Examiner—Heather Chun
Attorney, Agent, or Firm—Laney, Dougherty, Hessin & Beavers

[57] ABSTRACT

A double-containment pipe fitting and system for joining sections of double-containment pipe includes an outer containment housing, an inner carrier housing, and a plurality of restraining devices. The containment housing has a plurality of open ends. Each open end is constructed to securely connect to an open end of a containment pipe. the carrier housing has a plulrality of open ends constructed and arranged for positioning within the containment housing. Each open end of the carrier housing is constructed to securely connect to an open end of a carrier pipe. One restraining device is provided for each open end of the containment housing. The restraining device securely fastens the carrier housing to the containment housing and thereby restrains expansion and contraction of the carrier pipe and containment pipe. The carrier pipe and containment pipe are otherwise unrestrained against expansion and contraction. The double containment pipe fitting and system is suitable for use with filament wound pipe and other large diameter pipe.

35 Claims, 7 Drawing Sheets

U.S. PATENT DOCUMENTS

| | | | |
|---|---|---|---|
| 4,127,286 | 11/1978 | Albertsen | 285/41 |
| 4,142,366 | 3/1979 | Tanahashi et al. | 60/322 |
| 4,149,739 | 4/1979 | Morris | 285/133 |
| 4,185,463 | 1/1980 | Tanahashi et al. | 60/322 |
| 4,265,951 | 5/1981 | Yates et al. | 285/242 X |
| 4,422,675 | 12/1983 | Norris et al. | 285/45 |
| 4,441,743 | 4/1984 | Steenbergen | 285/21 |
| 4,441,783 | 4/1984 | Steenberger | 285/45 X |
| 4,514,244 | 4/1985 | Shaefer et al. | 156/158 |
| 4,521,037 | 6/1985 | Knox | 285/15 |
| 4,526,410 | 7/1985 | Vohrer | 285/915 |
| 4,653,541 | 3/1987 | Oehlschlaeger | 138/104 |
| 4,694,865 | 9/1987 | Tauschmann | 138/148 |
| 4,732,414 | 3/1988 | Inaba | 285/133 |
| 4,754,782 | 7/1988 | Grantham | 138/109 |
| 4,786,088 | 11/1988 | Ziu | 285/138 |
| 4,805,444 | 2/1989 | Webb | 73/40.5 |
| 4,886,305 | 12/1989 | Martin | 85/133.5 |

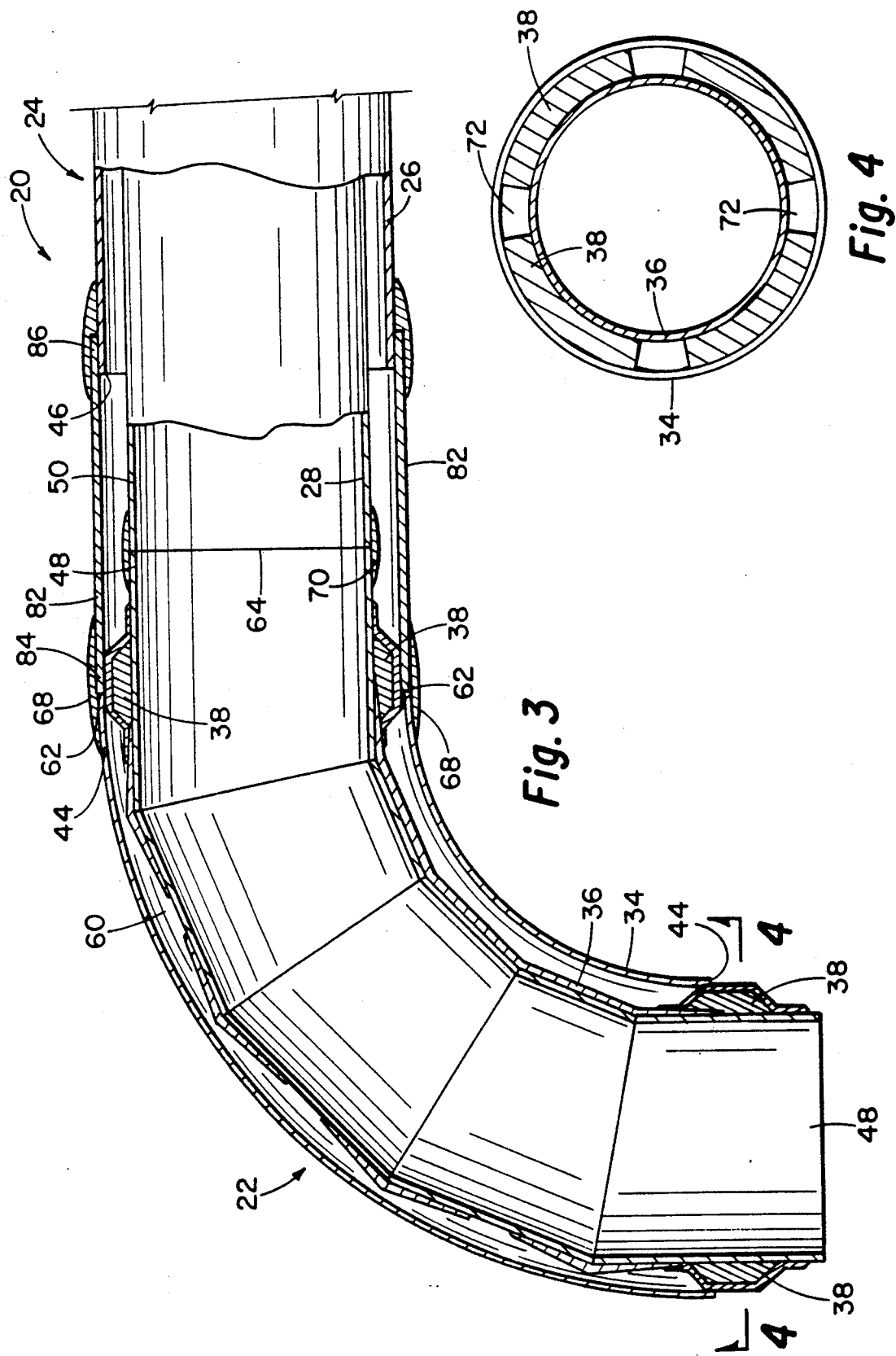

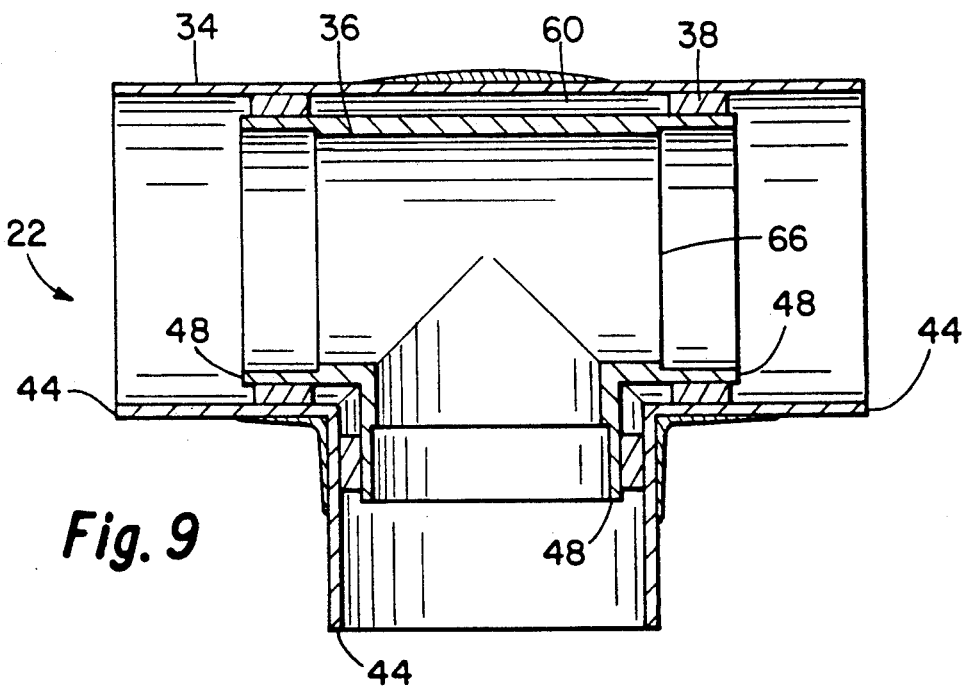
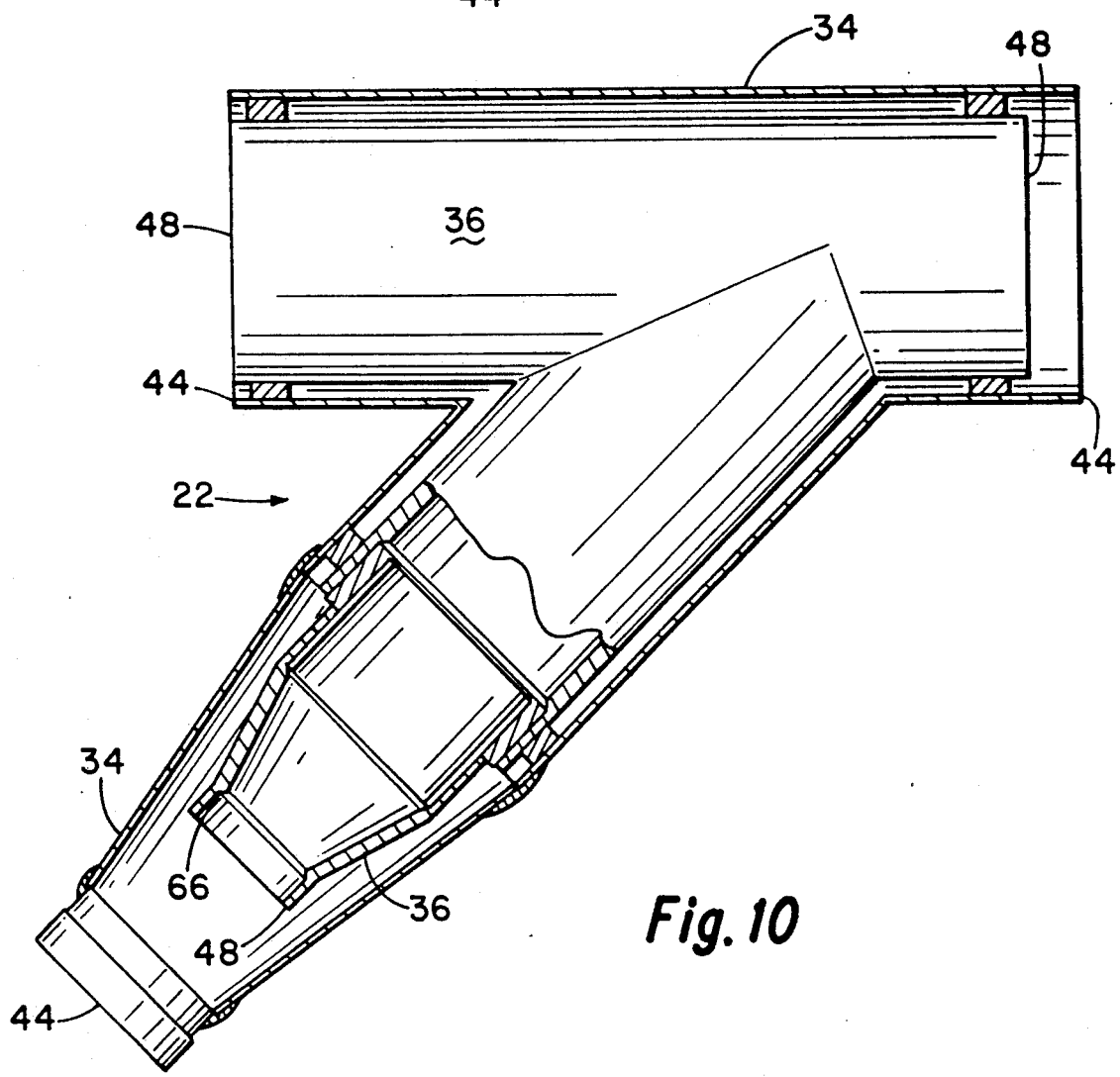

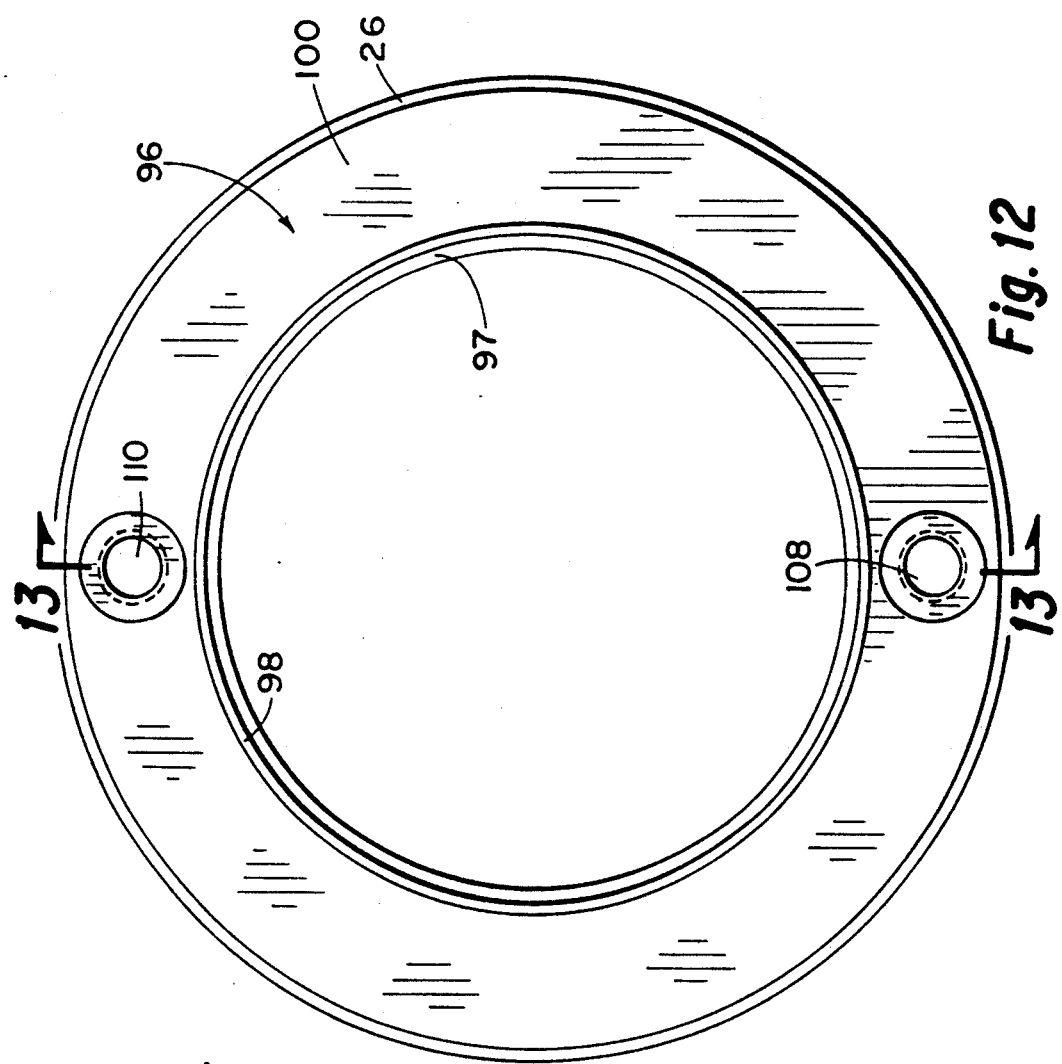
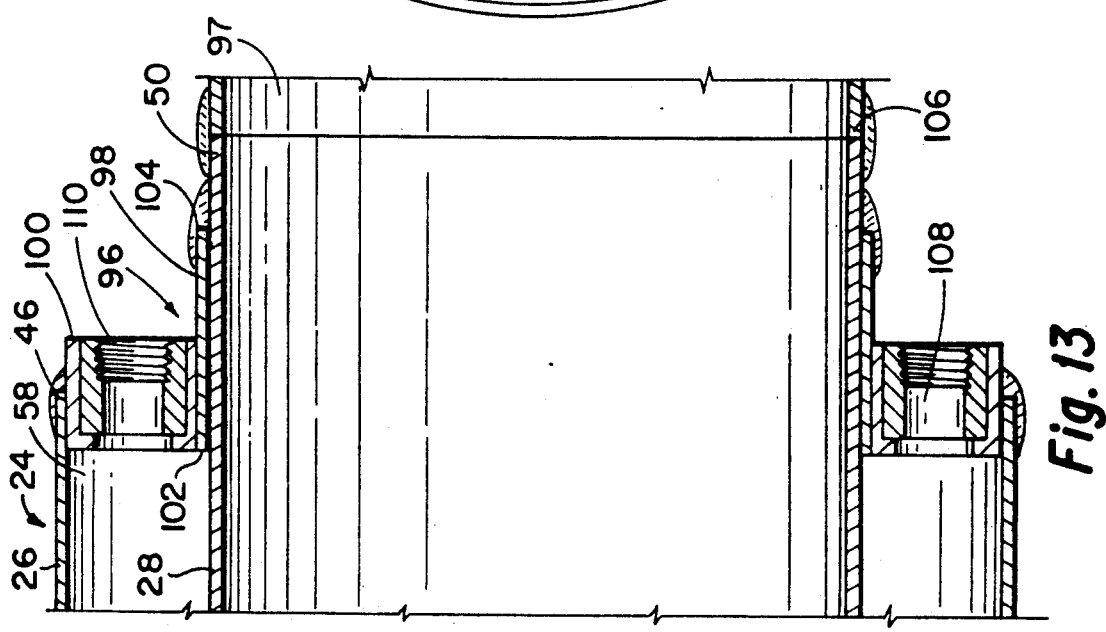

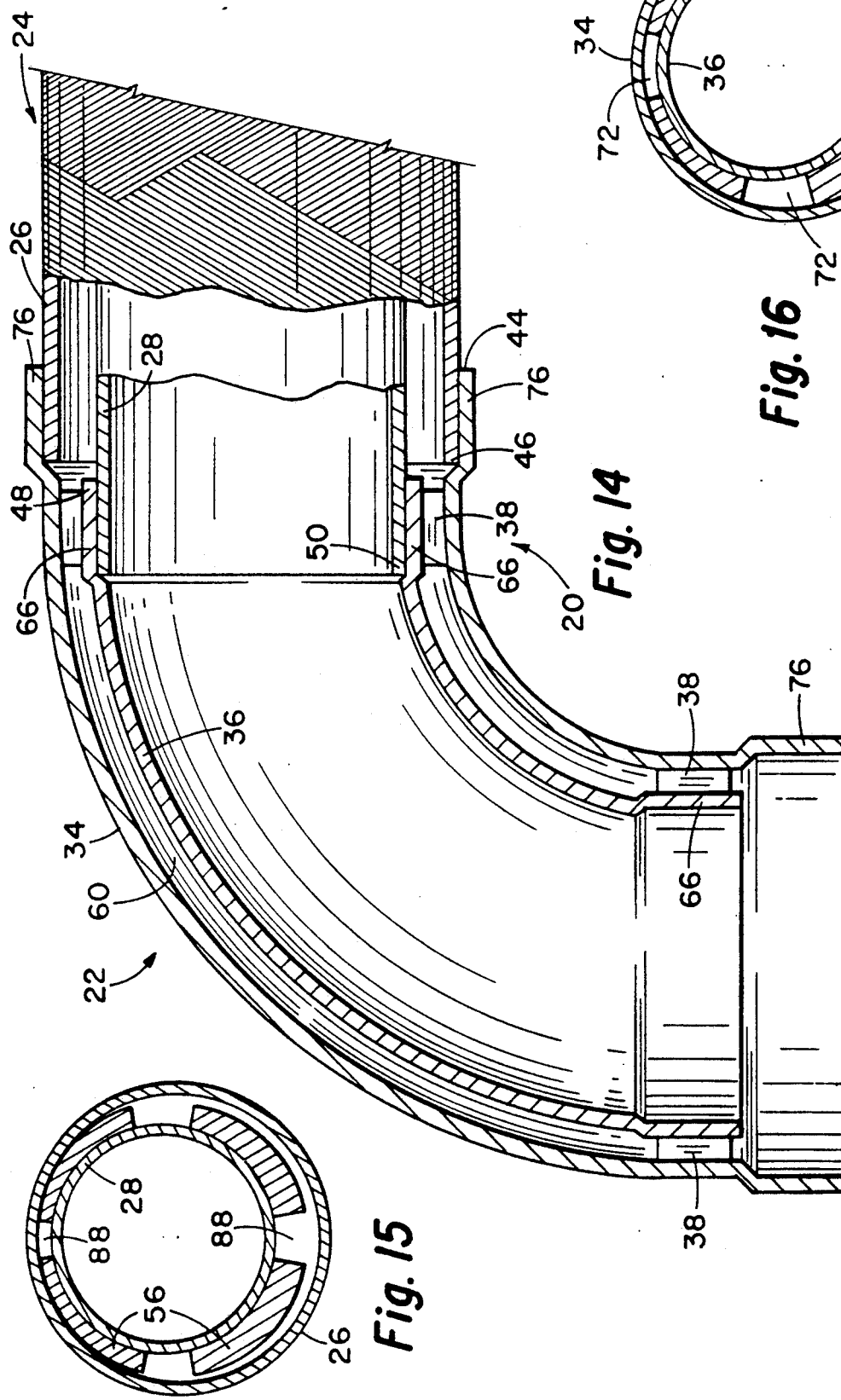
Fig. 14
Fig. 15
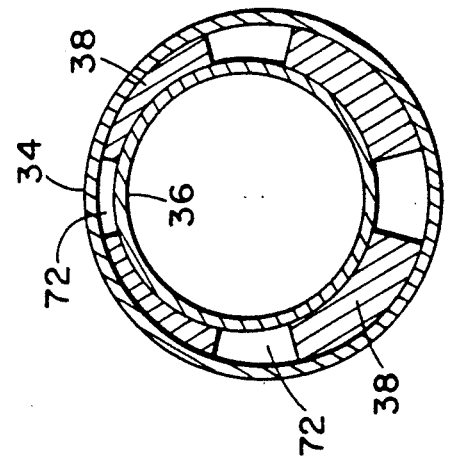
Fig. 16

DOUBLE-CONTAINMENT PIPE FITTINGS AND SYSTEM

BACKGROUND OF THE INVENTION

This invention relates to pipe and fittings and, more particularly, but not by way of limitation, the invention relates to double-containment piping systems used to contain leakage of hazardous fluids.

The use of dual containment piping systems in which an inner carrier pipe is coaxially placed within an outer containment pipe is a known and accepted commercial practice. Typically such systems have been found in the nuclear, oil and gas, petroleum refining, and chemical processing industries. The carrier pipe is used to transport hazardous or toxic fluid while the containment pipe is used to contain leakage from the carrier pipe. It is also known to provide leakage detectors and drainage systems within the annulus between the carrier and containment pipes.

One of the problems uniquely associated with double-containment pipe is created by the thermal expansion and/or contraction of the inner carrier pipe relative to the outer containment pipe. More specifically, the problem is restraining the contraction and expansion while providing a system which is relatively inexpensive in cost, installation, and maintenance.

Prior dual containment and concentric piping systems have addressed this problem by either providing restraints between the containment pipe and carrier pipe in the piping runs between fittings as well as between the inner carrier housing and the outer containment housing of the fittings, which greatly increases the cost of manufacturing and installing the systems; or by using restraint/socket-type restraint fittings having the restraining mechanism integral with a socket-type end connection for the containment housing of the fitting. Because of the structural complexity of the integral socket and restraining mechanism and the need for relatively close dimensional tolerances to assure proper fit and alignment of the integral socket and restraining mechanism with the fitting and with the desired orientation of the pipe runs connecting to the socket, the restraint/socket-type fittings need to be molded or cast, and are normally press-molded, i.e., because of the structural complexity and close dimensional tolerances the manufacturing alternative of hand laying up or hand machining the restraint/socket-type fitting is so labor intensive it is not economically or practically viable. Because the restraint/socket-type fittings are press-molded, the dimensions of the socket are fixed to the size of the mold and therefore limited to uses in which the O.D. (outer diameter) of the pipe spool is sufficiently controlled to seat and seal properly in the socket. The O.D. of fiber-reinforced thermoset resin ("thermoset") pipe cannot be controlled sufficiently to assure proper mating with a press-molded socket in pipe having an I.D. (internal diameter) greater than 14 inches. This is because thermoset pipe must be filament wound in sizes above 14 inch I.D. and the O.D. cannot be accurately controlled in the filament winding process (as opposed to pipe of 14 inch I.D. and below, which may be centrifugally cast and in which the O.D. is precisely controlled). Socket-type thermoset fittings may be press-molded in sizes of 14 inch I.D. and below; and may therefore be economically produced. However, in sizes above 14 inch I.D. the pressure rating of press-molded sockets is not reliable and therefore the socket must be hand made ("hand laid up"), and therefore the restraint/socket-type fitting is not suitable in sizes above 14 inch I.D. Similarly, in some industries, such as the pulp and paper industry, it is believed that the pressure rating of press-molded fittings of any size is not sufficiently reliable and hand made fittings are used exclusively. For the preceding reasons, prior to the present invention double-containment piping systems utilizing restraint fittings had not been designed or installed in sizes greater than 14 inch I.D. and the only double-containment pipe systems utilizing restraint fittings in sizes up to 14 inch I.D. utilized the fitting having a containment housing socket and integral restraint which must be press-molded to be of practical use.

Therefore, there is a need for a double-containment pipe fitting and system having a restraint-type fitting which may be used with all sizes of pipe; which may be used with both cast and filament wound thermoset resin pipe; which may be used with double-containment piping systems of virtually any material; which provides restraint against expansion, contraction, and other end loadings on the fittings exclusive of restraint in the pipe runs; which eliminates the need for expansion and contraction restraints in double containment pipe runs (or spools); which is relatively inexpensive to manufacture and install; which may be assembled using only adhesive connectors; and which may be economically manufactured and installed using socket-type connectors which are not press-molded.

SUMMARY OF THE INVENTION

The present invention is contemplated to overcome the foregoing deficiencies and meet the above-described needs. In order to accomplish this, the present invention provides a novel and improved double-containment pipe fitting and system in which the fitting provides the restraint against expansion, contraction, and end loadings of the otherwise unrestrained pipe runs; which may be used with pipe and fittings of virtually any size; and in which the restraint mechanism is manufactured and installed independently of the end connections of the fitting.

The double-containment pipe fitting and pipe system provides a pipe fitting for joining sections of double-containment pipe. Each section of double-containment pipe includes a containment pipe and a carrier pipe. The carrier pipe is located within the containment pipe. The carrier pipe and containment pipe are free to expand and contract relative to one another. The double-containment fitting includes a containment housing, a carrier housing, and a plurality of restraining means. The containment housing has a plurality of open ends, each open end being constructed to securely connect to an open end of a containment pipe. The carrier housing has a plurality of open ends constructed and arranged for placement within the containment housing, each open end being constructed to securely fasten to an open end of a carrier pipe. One restraining means is provided for each open end of the containment housing. The restraining means securely connects the carrier housing to the containment housing and restrains the expansion and contraction of the carrier pipe and containment pipe.

It is an advantage of the present invention to provide a double-containment pipe fitting and system utilizing restraint-type fittings which may be used with filament wound pipe.

It is an advantage of the present invention to provide a double-containment pipe fitting and system utilizing restraint-type fittings in which the fittings have reliable pressure ratings in sizes greater than 14 inch I.D. (internal diameter).

It is an advantage of the present invention to provide a double-containment pipe fitting and system utilizing restraint-type fittings which may be butt-jointed to the connecting double-containment pipe runs and which are therefore more economical to manufacture and install with filament wound pipe.

It is an advantage of the present invention to provide a prefabricatable double-containment restraint-type pipe fitting for use with filament wound pipe which provides access to the carrier pipe and containment pipe joints for ease of installation in the field.

It is an advantage of the present invention to eliminate the need for thermal expansion and contraction restraints in pipe spools or runs of double-containment filament wound pipe, as well as thermoset resin pipe and pipe of other materials.

It is an advantage of the present invention to provide a double-containment restraint-type pipe fitting and system which may be constructed using only adhesive connections.

It is an advantage of the present invention to provide a double-containment restraint-type pipe fitting which may be economically manufactured and installed using socket-type end connections which are not molded or cast.

It is an advantage of the present invention to provide a double-containment restraint-type pipe fitting having a restraining means which is manufactured and installed independently of the end connections on the carrier housing and containment housing and which is relatively inexpensive to manufacture and install.

It is an advantage of the present invention to provide a double-containment restraint-type pipe fitting in which the restraining means is manufactured and installed independently of the end connection for the carrier housing and which is relatively inexpensive to manufacture and install.

It is an advantage of the present invention to provide a double-containment restraint-type fitting and system in which the restraints are installed in pre-fabricated fittings and which therefore eliminates the need for installation of restraints in pipe sections or in fittings at the job-site.

It is an advantage of the present invention to provide a double-containment restraint-type pipe fitting and system which eliminates the need for installation of restraints during assembly of a double-containment pipe system.

It is an advantage of the present invention to provide a double-containment pipe system which eliminates the need for expansion and contraction restraints in linear runs of pipe, i.e., between fittings.

It is an advantage of the present invention to provide a double-containment piping system which is restrained against expansion and contraction only at points where there is a change in direction of the pipe, or where there are three or more connections to the pipe, or where the double-containment system terminates.

BRIEF DESCRIPTION OF THE DRAWINGS

The present invention will be better understood by reference to the examples of the following drawings:

FIG. 3 is a partially cut-away side view of another embodiment of a double-containment elbow fitting and double-containment pipe spool of the present invention;

FIG. 4 is a view taken along line 4—4 of FIG. 3;

FIG. 9 is a side sectional view of an embodiment of a double-containment tee fitting of the present invention;

FIG. 10 is an embodiment of a double-containment lateral fitting having a concentric reducer in the lateral connection of the present invention;

FIG. 12 is an end view of an embodiment of a double-containment end fitting of the present invention;

FIG. 13 is a view taken along line 13—13 of FIG. 12;

FIG. 14 is a partially cut-away side view of an embodiment of the double-containment elbow fitting and pipe spool of FIG. 1 in which socket-type end connectors are used on the carrier housing and the containment housing;

FIG. 15 is a sectional view of a pipe spool, similar to the pipe spool exemplified in FIG. 5, in which the longitudinal axis of the carrier pipe is offset with respect to the longitudinal axis of the containment pipe; and FIG. 16 is a sectional view of an embodiment of a double-containment elbow fitting, similar to those shown in FIGS. 1 and 3, in which the longitudinal axis of the carrier housing has been offset with respect to the longitudinal axis of the containment housing.

DETAILED DESCRIPTION OF THE PREFERRED EMBODIMENTS

Figures 1, 2:
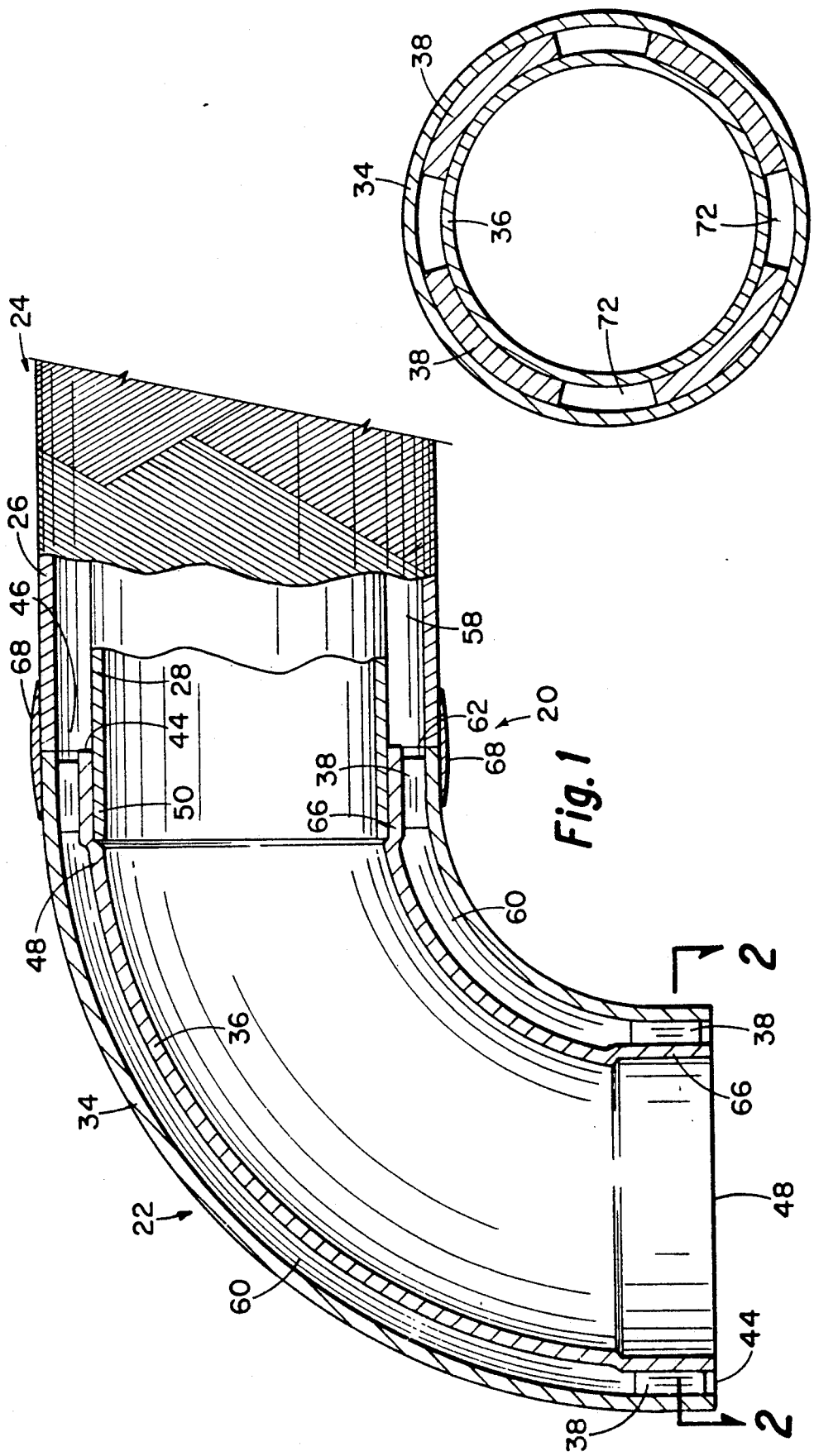
FIG. 1 is a partially cut-away side view of an embodiment of a double-containment elbow fitting and double-containment pipe spool of the present invention.
FIG. 2 is a view taken along line 2—2 of FIG. 1.

Before explaining the present invention in detail, it is intended to be understood that the invention is not limited to the details of construction, arrangements of parts, and methods described and illustrated herein, since the invention is capable of other embodiments and of being practiced or carried out in various ways commensurate with the attached claims. Also, it is intended to be understood that the phraseology or terminology employed herein is for the purpose of description and not of limitation.

FIGS. 1-14 present preferred embodiments of a double-containment pipe system 20 and pipe fitting 22 according to the present invention.

Referring to the example of FIGS. 1, 2, 3, and 4, the double-containment pipe system 20 includes a plurality of sections of double-containment pipe 24 and at least one double-containment fitting 22. By "fitting" is meant a connection device used to connect linear sections of pipe 24 where the pipe system 20 changes direction, e.g., a 90° elbow, 45° elbow or other connection device used where there is a non-linearity in the pipe system 20; or a connection device used where there are three or more connections into the pipe system 20, such as a tee fitting, lateral fitting, sampling fitting, or cross-fitting; or a connection device used where the double-containment system 20 terminates or transitions to single carrier pipe, such as at an end fitting. Each section of double-containment pipe 24 includes a containment pipe 26 and a carrier pipe 28. The carrier pipe is located within the containment pipe 28 so that the open ends of the pipes 24, 26 are coincidental. Preferably, the carrier pipe 28 is positioned within the containment pipe 26 so that the longitudinal axis of the carrier pipe 28 is about parallel with the longitudinal axis of the containment pipe 26. As exemplified in FIG. 15, the axis of the carrier pipe 28 may be offset from the axis of the containment 26, as will be further discussed below. More preferably, the carrier pipe 28 is positioned about coaxially within the containment pipe 26, as exemplified in FIGS. 1-4. The containment pipe 26 and carrier pipe 28 are free to expand and contract and to move axially relative to one another, that is, there is no restraint against differential thermal expansion and contraction or against differential axial motion in the double-containment pipe section 24. The only restraint against thermal expansion or contraction and axial motion of the containment pipe 26 relative to the carrier pipe 28 is in the fitting 22, as further discussed below.

The double-containment fitting 22 includes a containment housing 34, a carrier housing 36, and a plurality of restraining means 38. The containment housing 34 includes a plurality of open ends 44 with each open end 44 being constructed to securely connect to an open end 46 of a containment pipe 26. The carrier housing 36 has a plurality of open ends 48 constructed and arranged for placement within the containment housing 34 so that the open ends 48, 50 of the housing 34, 36 are coincidental. Preferably, the carrier housing 36 is positioned within the containment housing 34 so that the longitudinal axis or axes of the carrier housing 26 is about parallel with the longitudinal axis or axes of the containment housing 34. As exemplified in FIG. 16, the axis of the carrier housing 36 may be offset from the axis of the containment housing 34, as will be further discussed below. More preferably, the carrier housing 36 is positioned about coaxially within the containment housing 34, as exemplified in FIGS. 1-4. Each open end 48 of the carrier housing 36 is constructed to securely connect to an open end 50 of a carrier pipe 28. A restraining means 38 is provided for each open end 44 of the containment housing 34, i.e., for each open end 44, 48 of the containment housing 34 and carrier housing 36. The restraining means 38 securely connects the carrier housing 36 to the containment housing 34 and restrains any expansion and contraction of the carrier pipe 28 and containment pipe 26, such as thermal expansion and contraction, as well as other end loadings such as those created by pressure surges and fluid pulsations in the system 20. The restraining means 38 also restrains any expansion, contraction, or other motion of the carrier housing 36 and the container housing 34 relative to each other. The restraining means 38 also positions the carrier housing 36 within the containment housing 34, as further discussed below. By "securely connects" is meant any type of joining or fastening, such as welding, bolting, chemical bonding, threading, etc., compatible with the materials of which the fitting 22 is made, which will withstand the anticipated loadings and forces on the connection and which will restrain the anticipated expansion, contraction and other end loadings of the pipes 26, 28 on the fitting 22, as further discussed herein.

Figure 5:
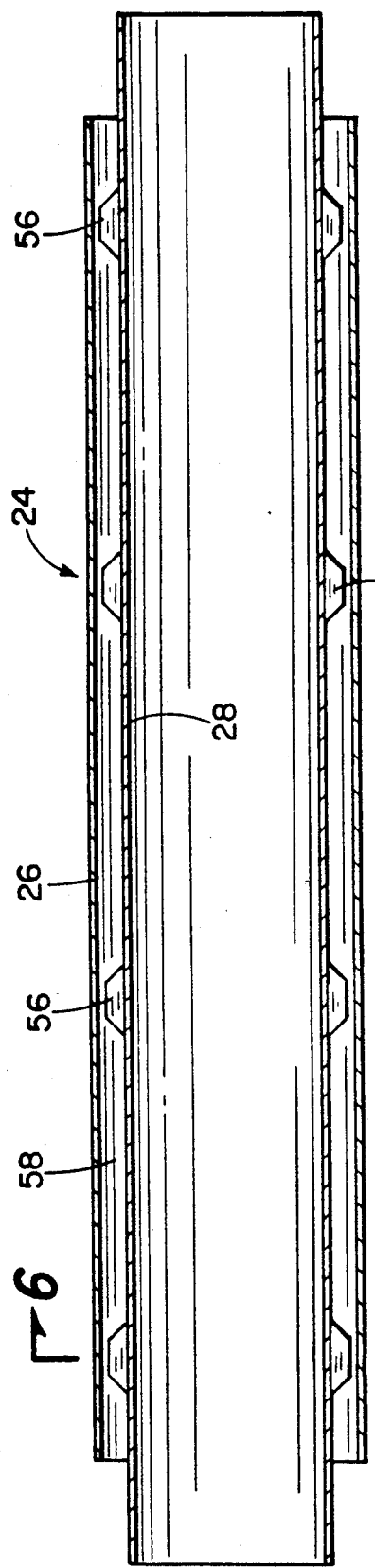
FIG. 5 is a side sectional view of an embodiment of a pipe spool of the present invention.
Figure 6:
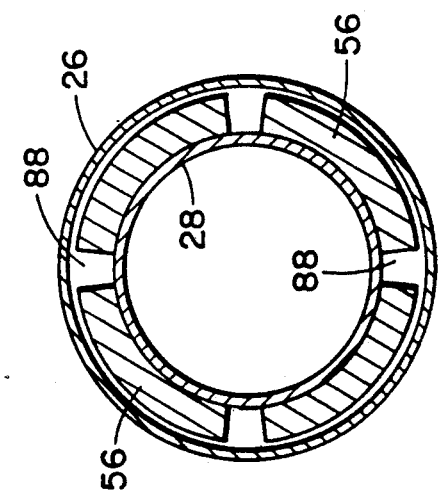
FIG. 6 is a view taken along line 6—6 of FIG. 5.

Referring to the example of FIGS. 5 and 6, as previously discussed, the carrier pipe 28 is positioned about coaxially or about axially parallel within the containment pipe 26. A plurality of carrier guides 56 are connected either to the I.D. (internal diameter) of the containment pipe or, most preferably, the carrier guides 56 are connected to the O.D. (outer diameter) of the carrier pipe. It is easier to access the outside surface of the carrier pipe 28 than the inside surface of the containment pipe 26 when installing the carrier guides 56. The carrier guides 56 position the carrier pipe 28 within the containment pipe 26, preferably about coaxially (FIG. 6) or about axially parallel (FIG. 15). The carrier guides 56 are distributed around the circumference and along the length of the carrier pipe 28. Although the carrier guides 56 may be effected using solid rings on the surface of the carrier pipe 28, preferably, the pipe annulus 58 is not totally obstructed by the carrier guides 56 and is left open at least at the lowermost point of the annulus to allow unrestricted gravity drainage of leaking fluid; and so that leak detectors or leak detection cable may be placed in the lowermost point of the annulus 58, as will be further discussed below. The carrier guides 56 do not restrict expansion or contraction of the pipes 26, 28. The pipes 26, 28 are free to move axially with respect to one another, i.e., the carrier guides 56 do not restrain axial motion of the containment and carrier pipes 26, 28 relative to one another.

The fitting 22, containment pipe 26, and carrier pipe 28 may be virtually any size. There should be sufficient difference in the sizes of the containment pipe 26 and carrier pipe 28 to create a continuous pipe annulus 58 large enough to contain fluid leakage from the carrier pipe 28 and leak detection equipment, and to house stationary guides 56 of functional size. As best exemplified in FIG. 15, the carrier guides 56 may be used to offset the longitudinal axis of the carrier pipe 28 from the longitudinal axis of the containment pipe 26 so that the annulus 58 is larger at a desired location, e.g., at the lowermost point in the containment pipe 26 to provide more room for leakage detection equipment and leakage. Similarly, there should be sufficient difference in the sizes of the containment housing 34 and the carrier housing 36 to create a continuous annulus 60 (FIGS. 1 and 3) through the fitting 22 which will contain fluid leakage, leak detection equipment, and house restraining means 38 of functional size. As best exemplified in FIG. 16, the restraining means 38 may be used to offset the longitudinal axis of the carrier housing 36 from the longitudinal axis of the containment housing 34 so that the annulus 60 is larger at a desired location, e.g., at the lowermost point in the containment housing 34 to provide more room for leakage detection equipment and leakage. In the embodiment of FIGS. 1 and 2, the containment pipe 26 and containment housing 34 have an I.D. of 16 inches while the carrier pipe 28 and carrier housing 36 have an I.D. of 12 inches. The invention may be utilized with virtually any size of pipe, but it has distinct advantages when the containment pipe 26 and containment housing 34 have an internal diameter greater than 14 inches, as discussed previously.

The double-containment system 20 may be made of virtually any material. The advantages and economies provided by the invention will be present in all materials, e.g., the elimination of the need to provide restraints securely fastened between the carrier pipe and containment pipe, the pre-fabrication of the fitting 22, and the simplification of the construction of the fitting 22 and restraint means 38. As previously discussed, the system 20 offers distinct advantages to double-containment systems made of materials which undergo significant thermal expansion and contraction, such as steel and other metals, polymers, etc. Preferably, the system 20 is made of polymer and more preferably is made of a fiber-reinforced thermoset resin, such as fiber-reinforced vinyl ester resin and fiber-reinforced epoxy resin. Most advantageously, the system 20 of the present invention is used with filament wound fiber-reinforced vinyl ester or epoxy resin, as further discussed below. Further description of materials acceptable for the present invention are described in U.S. Pat. No. 3,718,161 and U.S. Pat. No. 4,018,250, both of which are incorporated herein by reference thereto for purposes of disclosure.

The fitting 22 and system 20 may be utilized with end connections (i.e., the connection between the housings 34, 36 and pipes 26, 28) of virtually any type, e.g., threaded, flanged, welded, bonded, etc. Preferably, at least the end connection 62 between the containment pipe 26 and containment housing 34 is a butt-joint 62 and the end connection between the carrier pipe 28 and carrier housing 36 is either a butt-joint 64 (as exemplified in FIG. 3) or a socket-type connection 66 (as exemplified in FIG. 1).

Referring to the example of FIGS. 1–4, as previously discussed, a restraining means 38 is located at each open end 48, 50 of the containment and carrier housings 34, 36. The restraining means 38 converts the containment housing 34 and carrier housing 36 into a restraint fitting 22 which restrains expansion and contraction of the otherwise unrestrained containment pipe 26 and carrier pipe 28. The restraining means 38 transfers expansion and/or contraction of either one of the containment pipe 26 and the carrier pipe 28 to the other of the containment pipe 26 and carrier pipe 28. The fitting 22 and restraining means 38 act to compress the expanding one of the carrier pip 28 and containment pipe 26 and transfer the expansion into tension of the other of the carrier pipe 28 and containment pipe 26. Similarly, because of the restraining means 38, the fitting 22 tensions either one of the carrier pipe 28 and containment pipe 26 undergoing contraction and transfers the contraction into compression of the other of the carrier pipe 28 and containment pipe 26.

The restraining means 38 is made of a material compatible with the containment and carrier housings 34, 36 and is preferably made of the same material as the housings 34, 36. The restraining means 38 should have sufficient structural strength to withstand all anticipated loadings placed on the containment housing 34, carrier housing 36, and restraining means 38 by the expansion, contraction, and other end loadings of the containment pipe 26 and carrier pipe 28.

The restraining means 38 may be composed of individual pieces or parts which are secured in their position about the circumference of the fitting 22 as best exemplified in FIGS. 2 and 4, or may be a complete ring. Preferably, orifices 72 are created in the restraining means 38 to allow leakage to travel through the fitting 22. Preferably, an orifice 72 is positioned at the lowest point in the fitting annulus 60 to facilitate better drainage of leaks and to allow leak detection equipment to be placed in the lowest point of the annulus 60.

The restraining means 38 must be securely connected between the containment and carrier housings 34, 36. The containment pipe 26 and/or carrier pipe 28 may be directly connected to the restraining means 38 in addition to the containment and carrier housings 34, 36 if desirable or advantageous in a specific configuration. As will be further discussed below, in the preferred embodiment, the restraining means 38 is directly adhesively bonded to the containment housing 34 and to the carrier housing 36. The containment pipe 26 and/or the carrier pipe 28 may also be directly adhesively bonded to the restraining means 38. By "directly" connnected, "directly" bonded, etc. as used here and elsewhere in this document, is meant that there are no intermediate components in the connection (between the directly connected components) which serve any function other than to transmit or effect the connection of the directly connected components, e.g., there is not a section of containment pipe 26 between a direct connection of the restraining means 38 to the containment housing 34, or an extension of the restraining means between a direct connection of the containment pipe 26 to the containment housing 34.

The position and degree of adhesive contact and bonding between the respective surfaces of the restraining means 38, containment housing 34, carrier housing 36, containment pipe 26, and carrier pipe 28 may vary as long as the connection between the restraining means 38, containment housing 34, and carrier housing 36 is sufficiently strong to hold or restrain the double-containment pipe 24 under the anticipated compression and tension loadings, i.e., as long as there is sufficient structural strength between the restraining means 38, containment housing 34, and carrier housing 36 to transfer tension loading of one pipe 24, 26 into compression loading of the other pipe 24, 26 and vice versa, and the bonding of the pipes 26, 28 to the housings 34, 36 is sufficiently strong to maintain the secure connection of the pipes 24, 26 to the fitting 22. It is the secure and fast connection of the restraining means 38 between the containment and carrier housings 34, 36 which unites the containment and carrier housings 34, 36 and transforms them into an unified restraint and fitting which provides the advantageous restraining characteristics discussed above.

In one preferred embodiment, referring to the example of FIGS. 1 and 14, the restraining means 38 is connected directly and exclusively to the containment housing 34 and the carrier housing 36, the containment housing open end 44 is connected directly and exclusively to the containment pipe open end 46, and the carrier pipe open end 50 is connected directly and exclusively to the carrier housing open end 48. This embodiment is particularly suitable when a butt-joint 62 is used between the containment housing 34 and containment pipe 26 and when a socket-type connection 66 is used on the open end of the carrier housing 36.

Figure 11:
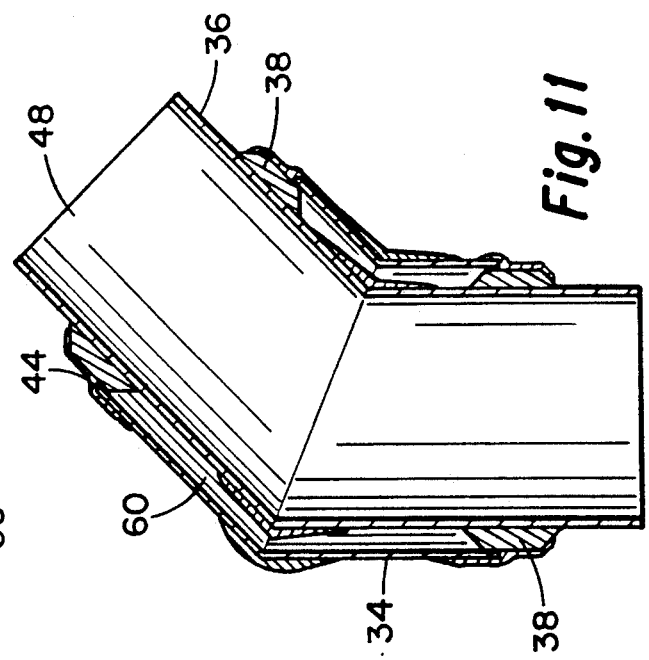
FIG. 11 is a side sectional view of another embodiment of a double-containment 45° elbow fitting of the present invention.

In another preferred embodiment, referring to the examples of FIGS. 3 and 11, the restraining means 38 is connected directly between the containment and carrier housings 34, 36 and is connected to the containment pipe 26 as well. This embodiment is particularly suitable when a butt-joint 62 is used between the containment pipe 26 and containment housing 34 and a butt-joint 64 is used between the carrier pipe 28 and carrier housing 36 as well. As exemplified in FIGS. 3 and 11, the carrier housing 36 may be extended beyond the containment housing 34 at each open end of the containment housing 34 which allows the butt-joint 64 of the carrier pipe 28 and carrier housing 36 to be accessed and made up first. The joint between the containment pipe 26 and containment housing 34 may be made up subsequently. This is of great advantage, since butt-joints must be welded if metal, plastic welded or fused if thermoplastic, and must be butt-strapped if made of thermoset resins, such as the fiber-reinforced vinyl ester and epoxy resins preferred with the present invention. All of these types of butt-joints require unobstructed access for completion, such as the embodiment of FIGS. 3 and 11 provides.

A more detailed description of the preferred embodiments exemplified in the attached drawings will now be provided. FIGS. 1, 2, 7, 8, 9, 10, and 14 illustrate an embodiment which is particularly suitable in double-containment piping systems 20 wherein the containment housing 34, carrier housing 36, and containment pipe 26 are made of filament wound thermoset resin (thermoset resin in which the structural reinforcement is provided by strands or filaments of fibers) and wherein the carrier pipe 28 and restraining means 38 are made of centrifugally cast fiber-reinforced thermoset resin. Preferably, the thermoset resin is either vinyl ester resin or epoxy resin. In this embodiment, referring to the example of FIGS. 1 and 7-10, each open end 48 of the carrier housing 36 includes a socket-type end connection 66 constructed to receive and adhesively bond to an open end 50 of a carrier pipe 28 and each open end 44 of the containment housing 34 is constructed to butt-joint 62 and butt-strap 68 to an open end 46 of the containment pipe 26. Butt-strap or butt-strapping refers to reinforcing a butt-joint by wrapping it with fiber-reinforced thermoset material, as would be well known to one skilled in the art in view of the disclosure contained herein. Preferably, the restraining means 38 is constructed and arranged for adhesively bonding to the outside surface of the carrier housing 36 and to the inside surface of the containment housing 34 at a location spaced away from the open ends 44, 48 of the containment housing 34 and carrier housing 36. For purposes of this description, the outside surface of the socket 66 and the outside surface of the carrier housing 36 are treated as the same since the socket 66 serves as an extension of the carrier housing 36 in connecting the carrier housing 36 to the carrier pipe 28. Referring to the example of FIG. 14, the embodiment just described may be modified such that each open end 44 of the containment housing 34 includes a socket-type end connection 76 constructed to receive and adhesively bond to an open end 46 of a containment pipe 26, in addition to each open end 48 of the carrier housing 36 including a socket-type end connection 66 constructed to receive and adhesively bond to an open end 50 of a carrier pipe 28.

FIG. 1 exemplifies a 90° elbow fitting 22. The containment housing 34 is made of 16 inch I.D. hand laid up pipe, preferably either fiber-reinforced vinyl ester resin or fiber-reinforced epoxy resin. The carrier housing 36 is made of 12 inch I.D. hand laid up pipe, preferably either fiber-reinforced vinyl ester resin or fiber-reinforced epoxy resin. In smaller sizes, particularly below eight inch I.D., one or both of the housings 34, 6 may be press-molded. Since the carrier pipe 28 is 12 inch I.D. it may be centrifugally cast. Normally cast pipe will be used if possible because it is considered a higher quality finished product having a precisely controlled O.D. (whereas filament wound pipe has an uncontrolled O.D.) as well as a controlled I.D. Also, as previously discussed, press-molded socket-type joints 66 may be used with cast pipe. Socket-type joints 66 are simpler to make up in the field, i.e., an adhesive can be placed on the open end 50 of the carrier pipe 28 and the pipe inserted into the socket 66 and the socket-type joint 66 is completed, and therefore press-molded socket-type connections 66 are preferred and used on the carrier housing 36 when the carrier pipe 28 is centrifugally cast. It should be noted that hand laid up socket-type joints may be used with any size and material of thermoset resin pipe, i.e., whether the pipe be filament wound or centrifugally cast, as the hand laid up socket-type connections are custom made and may be custom fit to the uncontrolled O.D. of the pipe. As previously discussed, cast pipe has a controlled O.D. and therefore press-molded sockets 66 which have a fixed socket size, may be reliably used with cast pipe and may also be more economically produced in sizes of 14 inch I.D. and under than hand laid up sockets. The restraining means 38 is adhesively bonded to the outside surface of the carrier pipe 28 and to the inside surface of the containment pipe 26, as best seen in FIG. 2. It should be noted that the socket 66 is an extension of the carrier housing 36 and the restraining means 38 is adhesively bonded to the outside surface of the socket 66 portion of the carrier housing 36 in the preferred embodiment. For carrier pipe 28 sizes which may be centrifugally cast, the restraining means 38 will normally be centrifugally cast in a ring which is then cut into segments and the segments adhesively bonded to the outside surface of the carrier pipe 28.

Referring to FIG. 1, after the carrier pipe 28 is adhesively bonded in the socket 66 of the carrier housing 36, the containment pipe 26 is moved axially with respect to the carrier pipe until an open end 46 of the containment pipe 26 is placed against the open end 44 of the containment housing 34 to form a butt-joint 62. Adhesive is placed between the ends of the containment pipe 26 and containment housing 34 to adhesively bond the pipe 26 to the housing 34 and then the joint is butt-strapped 68, as would be well known to one skilled in the art in the view of the disclosure container herein. This same type connection of the pipes 26, 28 to the housings 34, 36 is used at each open end 44, 48 of the housings 34, 36. The explanation in the preceding paragraph applies equally as well to the example embodiment of FIG. 14, excepting the connection of the containment pipe 26 to the containment housing 34. Referring to FIG. 14, after the carrier pipe 28 and carrier housing 36 are adhesively bonded as described in the preceding paragraph, the containment pipe 26 is moved axially with respect to the carrier pipe 28 until an open end 46 of the containment pipe 26 is adjacent a socket 76 of the containment housing 34. Adhesive is placed on the open end 46 of the containment pipe 26 and/or on the inside of the socket 76 and the containment pipe 26 is moved into the socket 76 until it properly seats.

When the double-containment piping system 20 is closed between two fittings 22, which may take place at a fitting 22 or at a joint in the piping run (not illustrated) between fittings 22, the carrier pipes 28 are joined using a butt-joint and butt-strapping as discussed above, and a cover joint, similar to the cover joint 82 illustrated in FIG. 3, is sleeved over the outside surface of the containment pipe 26 and is positioned to bridge the opening between adjacent sections of containment pipe 26 or between the containment pipe 26 and containment housing 34, similar to the illustration of FIG. 3.

Figure 7:
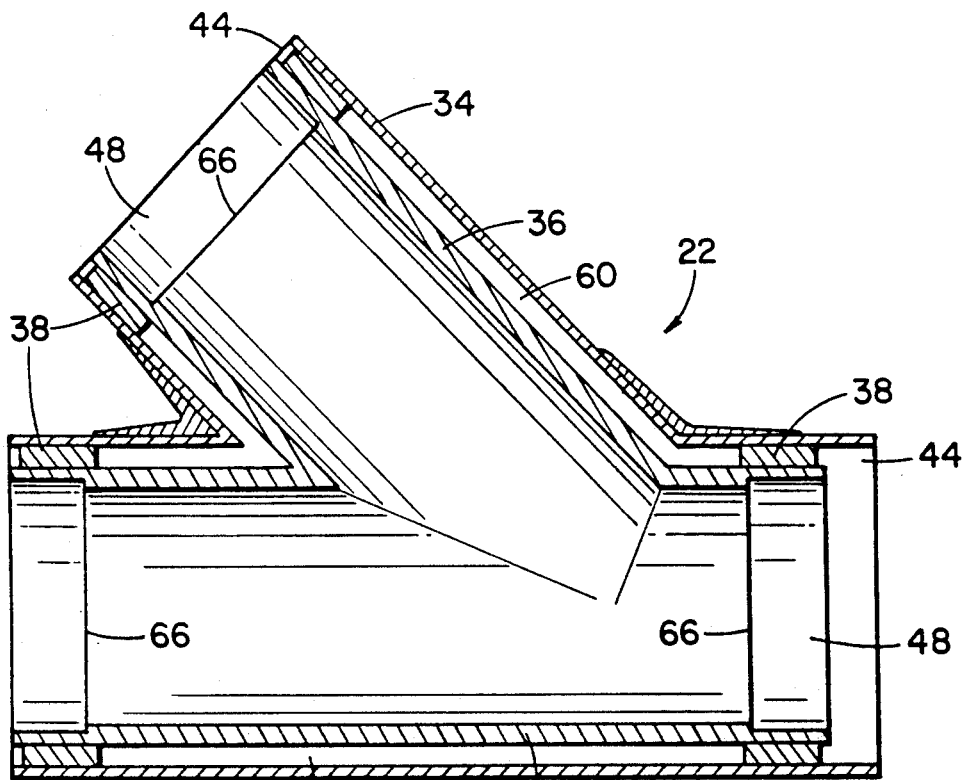
FIG. 7 is a side sectional view of an embodiment of a double-containment lateral fitting of the present invention.
Figure 8:
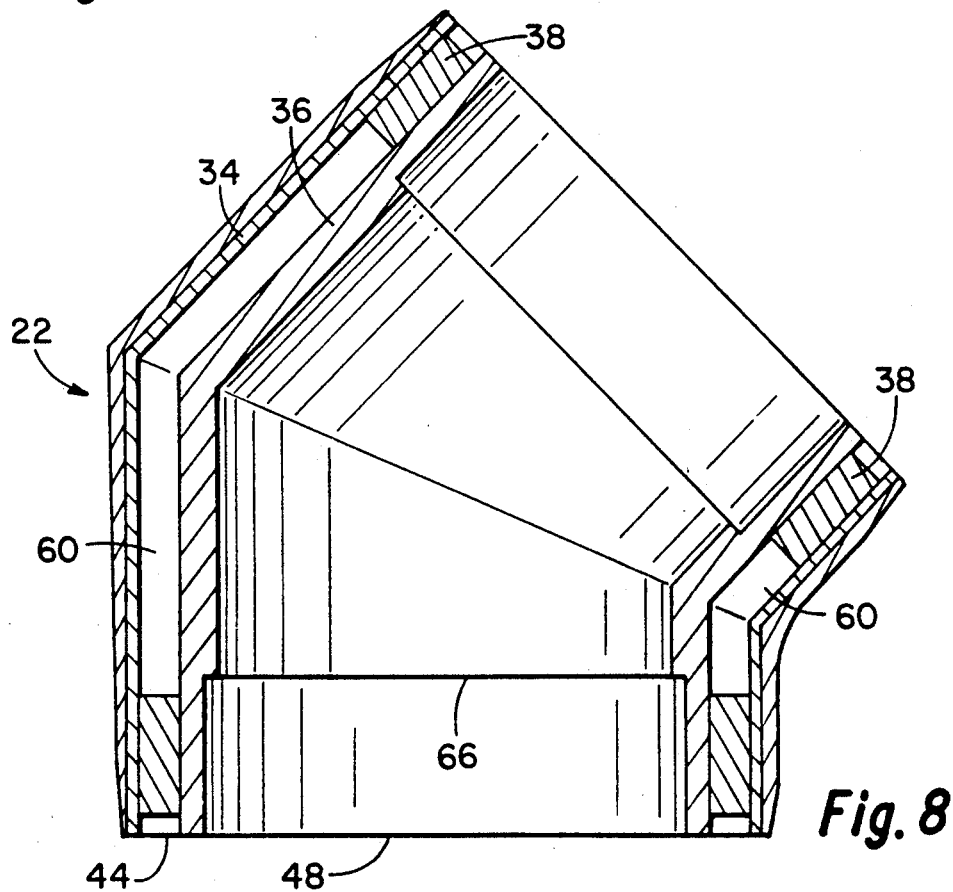
FIG. 8 is a side sectional view of an embodiment of a double-containment 45° elbow fitting of the present invention.

FIGS. 7, 8, 9, and 10 illustrate a few pipe fitting typical of possible configurations utilizing the present invention. In FIGS. 7-10, the component identification numbers of FIGS. 1 and 2 have been used to identify the same components, e.g., fitting 22, containment housing 34, carrier housing 36, restraining means 38, and socket-type joint 66, etc. FIGS. 7–10 utilize a 16 inch I.D. filament wound containment housing 34 and a 12 inch I.D. carrier housing 36. The housing 34, 36 are made of the same material as the embodiment of FIGS. 1 and 2 previously discussed. FIG. 7 exemplifies a double-containment restraint-type lateral fitting; FIG. 8 exemplifies a double-containment, restraint-type 45° elbow fitting; FIG. 9 exemplifies a double-containment, restraint-type, tee fitting; and FIG. 10 exemplifies a double-containment, restraint-type, lateral fitting having a concentric reducer in the lateral, all of which fittings would be known to one skilled in the art in view of the disclosure contained herein. It should be noted that the system 20 and fitting 22 of the present invention described with FIGS. 1–14 may be utilized with many other configurations of pipe fittings and systems not illustrated in the accompanying drawings. The application of the present invention to other known configurations of pipe fittings and pipe systems would be known to one skilled in the art in view of the disclosure contained herein.

FIGS. 3, 4, and 11 exemplify an embodiment of the pipe system 20 and fitting 22 of the present invention wherein the containment housing 34 and carrier housing 36 are preferably made of hand laid up or filament wound thermoset resin; and the containment pipe 26 and carrier pipe 28 are preferably made of filament wound thermoset resin; and wherein the restraining means 38 is made of fiber-reinforced thermoset resin. Preferably, each open end 48 of the carrier housing 36 is constructed to butt-joint 64 and butt-strap 70 to an open end 50 of the carrier pipe 28 and each open end 44 of the containment housing 34 is constructed to butt-joint 62 and butt-strap 68 to an open end 46 of the containment pipe 26. As exemplified in FIG. 3, preferably the open ends 48 of the carrier housing 36 extend beyond the open ends 44 of the containment housing 34. The restraining means 38 is constructed and arranged for adhesively bonding to the outside surface of the carrier housing 36, to the inside surface of the containment housing 34, and to the inside surface of the containment pipe 36.

FIG. 3 exemplifies an embodiment of a hand made elbow fitting 22, preferably made of either fiber-reinforced vinyl ester resin or fiber-reinforced epoxy resin. The containment housing 34 is 20 inch I.D., and the carrier housing 36 is 16 inch I.D. In the embodiment of FIG. 3, the containment housing 34 is hand laid up and the carrier housing 36 is made of mitred, filament-wound pipe segments connected by butt-strapped joints, both of which constructions would be known to one skilled in the art in view of this disclosure. Depending on tooling availability and fitting size, particularly in sizes of 16 inch I.D. and larger, the housings 34, 36 preferably are constructed by hand lay up; or of mitred, filament wound pipe segments; or one housing may be made of each construction. The restraining means 38 is also hand laid up on the outside surface of the carrier pipe 28 in a manner which would be well known to one skilled in the art in view of the disclosure contained herein. The containment housing 34 is adhesively bonded to a restraining means 38 at each open end 44 of the containment housing 34. A carrier pipe 28 is connected to each open end 48 of the carrier housing 36 (although for purposes of drawing simplification, this is illustrated only at one end of the fitting 22 in FIG. 3). A butt-joint 64 is formed between the carrier pipe 28 and carrier housing 36 and the joint 64 is first adhesively bonded and then reinforced with butt-strapping 70 as would be known to one skilled in the art in view of the disclosure contained herein.

Containment pipe 26 is connected to the restraining means 38 and containment housing 34 with cover joint 82. The cover joint 82 acts as an extension of the containment pipe 26. The cover joint 82 sleeves over the outside surface of the containment pipe 26 and, after the carrier pipe 28 and carrier housing 36 are joined, the cover joint 82 is telescoped across the gap between the containment pipe 26 and containment housing 34 to form a butt-joint with the containment housing 34. The cover joint 82 is then adhesively bonded to the restraining means 38 and containment housing 34 at the first end 84 of the cover joint. The second end 86 of the cover joint is adhesively bonded to the outside surface of the containment pipe 26. The joints at the first and second ends 84, 86 of the cover joint 82 are then butt-strapped to reinforce the joints, as would be known to one skilled in the art in view of the disclosure contained herein. The cover 82 is used because of the large size and weight of the containment pipe 26. Although the containment pipe 26 is free to move axially with respect to the carrier pipe 28 and would be possible to slide the containment pipe 26 into contact with the restraining means 38 and containment housing 34, because of the difficulty of doing so it is simpler to use the cover joint 82. A cover joint 82 will also be used to make up the connection of the containment pipe 26 to the containment housing 34 at all other open ends of the containment housing 34. Also, a cover joint 82 will be used to make up the joint between adjacent containment pipes 26 at pipe joints between fittings 22, as would be known to one skilled in the art in view of the disclosure contained herein.

FIG. 4 illustrates the arrangement of the restraining means 38 in the fitting 22 of FIGS. 3 and 11. The restraining means 38 is normally hand laid up as a ring on the outside surface of the carrier housing 36 and the orifices 72 are cut in the restraining means 38 as desired. Preferably, there are four orifices 72 with one at the lowermost point in the annulus 60 of the fitting 22.

FIGS. 5 and 6 exemplify a section of double-containment pipe 24, also known as pipe run or pipe spool, such as would be connected between two fittings 22. One or more sections 24 may be used between two fittings 22. Typically, the joining of the sections 24 will be butt-jointed and butt-wrapped using a cover joint 82 between adjacent containment housings 34, as has been discussed previously. In each section 24, the containment pipe 26 sleeves over the carrier pipe 28 and is guided by and rests upon the carrier guides 56. The carrier guides 56 are made and placed upon the carrier pipe 28 in the same manner in which the restraining means 38 are made and placed upon the carrier housing 36, i.e., if the carrier pipe 28 is centrifugally cast the carrier guides 56 are centrifugally cast and if the carrier pipe is filament would the carrier guides 567 are hand laid up on the carrier pipe 28. As with the restraining means 38, orifices 88 should be placed in the carrier guides 56 to allow fluid passage and to provide space for leak detection equipment in the lowermost portion of the pipe annulus 58. The carrier guides 56 should be placed along the length of the carrier pipe 28 at close enough intervals to maintain an annulus 58 of relatively constant size, i.e., to maintain a uniform spacing between the containment pipe 26 and carrier pipe 28. For example, in a prototype embodiment, the containment pipe is 20 inch I.D., the carrier pipe is 16 inch I.D., the carrier pipe is 40 feet long, and the carrier guides 56 are placed on ten foot centers along the length of the carrier pipe 28.

FIG. 11 exemplifies a 45° elbow fitting made in accordance with the description of FIG. 3. The component numbers of FIG. 3 are used to identify the same components of FIG. 11. The pipe system 20 and fitting 22 of the present invention described with FIGS. 3, 4, and 11 may be utilized with many other arrangements and configurations of pipe fittings and systems as would be known to one skilled in the art in view of the disclosure contained herein.

FIGS. 12 and 13 exemplify an end fitting 96 used when it is desired to transition from a dual containment pipe section 24 or fitting 22 to a single, uncontained carrier pipe 97. The end fitting 96 includes a transition pipe 98 and an annular transition restraining means 100. The transition pipe has a first open end 102 and a second open end 104 for securely connecting the end fitting 96 to a carrier pipe 28 of the double-containment pipe system 20. The annular transition restraining means 100 is securely connected to and extends from the outside surface of the transition pipe 98 for securely connecting to an inside surface of the open end 48 of the containment pipe 26 associated with the carrier pipe 28 to which the transition pipe second open end 104 is connected. The transition restraining means 100 also seals the annulus 58 between the carrier pipe 28 and the containment pipe 26 and restrains expansion and contraction of the carrier pipe 28 and containment pipe 26. As previously mentioned, the end fitting 96 is also used for transitioning from an uncontained carrier pipe 97 to a double-containment fitting, i.e., the transition pipe first open end 102 is connected to the carrier housing and the transition restraining means 100 is connected to the containment housing of the fitting 22. As with the application of the end fitting to the dual containment pipe section 24, when connected to a fitting 22, the transition restraining means 100 will serve to transfer end loadings from the carrier housing (or carrier pipe 28) to the containment housing (or containment pipe 26) and vice-versa. One or more sealable vents 108, 110 may be provided in the transition restraining means for accessing the annulus 58 between the carrier pipe 28 and the containment pipe 26 which is sealed by the transition restraining means 100.

In the preferred embodiment, the transition pipe 98 is a short section of cover joint stock. The first and second open ends 102, 104 of the transition pipe 98 are sleeved over the open end 50 of the carrier pipe 28 and the end fitting 96 is positioned on the carrier pipe 28 so that the first open end 102 of the transition pipe 98 is inserted into the fitting 22 or pipe section 24 to be closed. The transition restraining means 100 is positioned so that it partially extends into the containment pipe 26 (or containment housing 34 if connecting to a fitting 22). The transition restraining means 100 is sized such that it fits inside the open end 46 of the containment pipe 26 and is adhesively bonded and butt-strapped or otherwise securely connected to the open end 46 of the pipe 26, as would be known to one skilled in the art in view of the disclosure contained herein. Preferably, the transition pipe 98 is adhesively bonded to the carrier pipe 28 and the second end 104 of the transition pipe 98 is butt-strapped to the carrier pipe 28. The open end 50 of the carrier pipe 28 is butt-strapped or otherwise securely connected to the open end 106 of the uncontained carrier pipe 97.

Vents 106, 108 are provided as required for accessing the pipe annulus 58 (or fitting annulus 60). The lower vent 108 will typically be used for pulling and accessing leak detection equipment and for draining leakage from the system 20. The upper vent 106 which may be placed where desired on the transition restraining means 100, may be used for hydraulic testing of the system 20; purging the annuli 58, 60; and venting the annuli 58, 60. Other uses and arrangements of the vents 106, 108 will be known to one skilled in the art in view of the disclosure contained herein.

Other embodiments of double-containment pipe fittings invented by the inventor of the present invention are disclosed in U.S. Pat. No. 4,886,305, which is incorporated herein by reference thereto for purposes of disclosure.

While presently preferred embodiments of the invention have been described herein for the purpose of disclosure, numerous changes in the construction and arrangement of parts and the performance of steps will suggest themselves to those skilled in the art, which changes are encompassed within the spirit of this invention as defined by the following claims.

I claim:

1. A double-containment pipe fitting for joining sections of double-containment pipe, each section of double-containment pipe including a containment pipe and a carrier pipe positionable inside the containment pipe, the fitting comprising:

a containment housing having a plurality of open ends, each open end being constructed to securely connect to an open end of containment pipe;

a carrier housing having a plurality of open ends constructed and arranged for positioning within the containment housing, each open end being constructed to securely connect to an open end of a carrier pipe; and a plurality of restraining means, at least one restraining means located at each open end of the containment housing and connected to the inside surface of the containment housing and to the outside surface of the carrier housing, for securely connecting the carrier housing to the containment housing and for restraining expansion and contraction of the carrier pipe and containment pipe, the carrier pipe and containment pipe being otherwise unrestrained against expansion and contraction.

2. A pipe fitting of claim 1:

wherein the restraining means transfers expansion and contraction of one of the containment pipe and the carrier pipe to the other of the containment pipe and the carrier pipe.

3. A pipe fitting of claim 1:

wherein the restraining means compresses an expanding one of the carrier pipe and the containment pipe and transfers the expansion into tension of the other of the carrier pipe and the containment pipe; and wherein the restraining means tensions a contracting one of the carrier pipe and the containment pipe and transfers the contraction into compression of the other of the carrier pipe and the containment pipe.

4. A pipe fitting of claim 1:

wherein the containment pipe is directly connected to the containment housing and to the restraining means.

5. A pipe fitting of claim 1:
wherein each open end of the containment housing is directly connected to an open end of a containment pipe; and
wherein each open end of the carrier housing is directly connected to an open end of carrier pipe; and
wherein each restraining means is directly connected between the containment housing and the carrier housing at a location spaced away from the open ends of the containment pipe and carrier pipe.

6. A pipe fitting of claim 1:
wherein the containment housing, carrier housing, and containment pipe are made of filament wound thermoset resin; and
wherein the carrier pipe and restraining means are made of centrifugally-cast fiber-reinforced thermoset resin.

7. A pipe fitting of claim 6:
in which each open end of the carrier housing comprises a socket-type end connection for receiving and adhesively bonding to an open end of a carrier pipe; and
wherein the open ends of the containment housing are further defined as butt-jointing and butt-strapping to the open ends of the containment pipe.

8. A pipe fitting of claim 7:
wherein the restraining means is further defined as adhesively bonding to the outside surface of the carrier housing and to the inside surface of the containment housing at a location spaced away form the open ends of the carrier housing and the containment housing.

9. A pipe fitting of claim 6:
in which each open end of the carrier housing comprises a socket-type end connection for receiving and adhesively bonding to an open end of a carrier pipe; and
in which each open end of the containment housing comprises a socket-type end connection for receiving and adhesively bonding to an open end of a containment pipe.

10. A pipe fitting of claim 1:
wherein the containment housing, carrier housing, containment pipe, and carrier pipe are made of filament wound thermoset resin; and
wherein the restraining means is made of fiber-reinforced thermoset resin.

11. A pipe fitting of claim 10:
wherein the open ends of the carrier housing are further defined as butt-jointing and butt-strapping to the open ends of the carrier pipe; and
wherein the open ends of the containment housing are further defined as butt-jointing and butt-strapping to the open ends of the containment pipe.

12. A pipe fitting of claim 11:
wherein the open ends of the carrier housing extend beyond the open ends of the containment housing.

13. A pipe fitting of claim 11:
wherein the restraining means is further defined as adhesively bonding to the outside surface of the carrier housing, to the inside surface of the containment housing, and to the inside surface of the containment pipe.

14. A pipe fitting of claim 10:
in which each open end of the carrier housing comprises a socket-type end connection for receiving and adhesively bonding to an open end of a carrier pipe; and
in which each open end of the containment housing comprises a socket-type end connection for receiving and adhesively bonding to an open end of a containment pipe.

15. A double-containment pipe system, comprising:
a plurality of sections of double-containment pipe, each section of double-containment pipe including a containment pipe and a carrier pipe, the carrier pipe being positioned within the containment pipe, there being no positive restraints within the sections against expansion and contraction of the carrier pipe and containment pipe; and
at least one double-containment fitting, comprising:
a containment housing having a plurality of open ends, each open end being constructed to securely and directly connect to an open end of a containment pipe;
a carrier housing having a plurality of open ends constructed and arranged for positioning within the containment housing, each open end being constructed to securely and directly connect to an open end of a carrier pipe; and
a plurality of restraining means, at least one restraining means located at each open end of the containment housing and connected to the inside surface of the containment housing and the outside surface of the carrier housing, for securely connecting the carrier housing to the containment housing and for restraining expansion and contraction of the carrier pipe and containment pipe.

16. A pipe system of claim 15:
wherein the containment housing, carrier housing, and containment pipe are made of filament wound thermoset resin; and
wherein the carrier pipe and restraining means are made of centrifugally-cast fiber-reinforced thermoset resin.

17. A pipe system of claim 16:
in which each open end of the carrier housing comprises a socket-type end connection for receiving and adhesively bonding to an open end of a carrier pipe; and
wherein each open end of the containment housing is further defined as butt-jointing and butt-strapping to an open end of the containment pipe.

18. A pipe system of claim 17:
wherein the restraining means is further defined as adhesively bonding to the outside surface of the carrier housing and to the inside surface of the containment housing at a location spaced away from the open ends of the carrier housing and the containment housing.

19. A pipe system of claim 16:
in which each open end of the carrier housing comprises a socket-type end connection for receiving and adhesively bonding to an open end of a carrier pipe; and
in which each open end of the containment housing comprises a socket-type end connection for receiving and adhesively bonding to an open end of a containment pipe.

20. A pipe system of claim 15:

wherein the containment housing, carrier housing, containment pipe, and carrier pipe are made of filament wound thermoset resin; and wherein the restraining means is made of fiber-reinforced thermoset resin.

21. A pipe system of claim 20:

wherein each open end of the carrier housing is further defined as butt-jointing and butt-strapping to an open end of the carrier pipe; and wherein each open end of the containment housing is further defined as butt-jointing and butt-strapping to an open end of the containment pipe.

22. A pipe system of claim 21:

wherein the open ends of the carrier housing extend beyond the open ends of the containment housing.

23. A pipe system of claim 21:

wherein the restraining means further defined as adhesively bonding to the outside surface of the carrier housing, to the inside surface of the containment housing, and to the inside surface of the containment pipe.

24. A pipe system of claim 20:

in which each open end of the carrier housing comprises a socket-type end connection for receiving and adhesively bonding to an open end of a carrier pipe; and in which each open end of the containment housing comprises a socket-type end connection for receiving and adhesively bonding to an open end of a containment pipe.

25. A pipe system of claim 20, comprising:

an end fitting for transitioning from an uncontained carrier pipe to a double containment pipe system, the end fitting comprising:

a transition pipe having a first open end and a second open end for securely connecting the end fitting to an open end of a carrier housing of the double-containment pipe system; and an annular transition restraining means, securely connected to and extending from the outside surface of the transition pipe, for securely connecting to an inside surface of an open end of a containment housing associated with the carrier housing to which the transition pipe is connected, for sealing the annulus between the carrier housing and the containment housing, and for transferring end loadings from the carrier housing to the containment housing.

26. A pipe system of claim 20 in which the transition restraining means further comprises:

a sealable vent for accessing the sealed annulus between the carrier housing and the containment housing.

27. A pipe system of claim 15, comprising:

an end fitting for transitioning from an uncontained carrier pipe to a double-containment pipe system, the end fitting comprising:

a transition pipe having a first open end and a second open end for securely connecting the end fitting to a carrier pipe of the double-containment pipe system; and an annular transition restraining means, securely connected to and extending from the outside surface of the transition pipe, for securely connecting to an inside surface of an open end of a containment pipe associated with the carrier pipe to which the transition pipe is connected, for sealing the annulus between the carrier pipe and the containment pipe, and for restraining expansion and contraction of the carrier pipe and containment pipe.

28. A pipe system of claim 27 i which the transition restraining means further comprises:

a sealable vent for accessing the sealed annulus between the carrier pipe and the containment pipe.

29. A double-containment pipe fitting for joining sections of double-containment pipe, each section of double-containment pipe including a containment pipe and a carrier pipe positionable inside the containment pipe, the fitting comprising:

a containment housing having a plurality of open ends, each open end being constructed to securely connect an open end of containment pipe;

a carrier housing having a plurality of open ends constructed and arranged for positioning within the containment housing, each open end being constructed to securely connect to an open end of a carrier pipe; and a plurality of restraining means, at least one restraining means located at each open end of the containment housing and directly connected between the containment housing and the carrier housing at a location spaced away from the open ends of the containment pipe and carrier pipe, for securely connecting the carrier housing to the containment housing and for restraining expansion and contraction of the carrier pipe and containment, the carrier pipe and containment pipe being otherwise unrestrained against expansion and contraction.

30. A pipe fitting of claim 29:

wherein the containment housing, carrier housing, and containment pipe are made of filament-wound thermoset resin; and wherein the carrier pipe and restraining means are made of centrifugally-cast, fiber-reinforced thermoset resin; and wherein each open end of the carrier housing comprises a socket-type end connection for receiving and adhesively bonding to an open end of a carrier pipe; and wherein the open ends of the containment housing are further defined as butt-jointing and butt-strapping to the open ends of the containment pipe; and wherein the restraining means is further defined as adhesively bonding to the outside surface of the carrier housing and to the inside surface of the containment housing at a location spaced away form the open ends of the carrier housing and the containment housing.

31. A double-containment pipe system, comprising:

a plurality of sections of double-containment pipe, each section of double-containment pipe including a containment pipe and a carrier pipe, the carrier pipe being positioned within the containment pipe, there being no positive restraints within the pipe sections against expansion and contraction of the carrier pipe and containment pipe; and at least one double-containment fitting, comprising:

a containment housing having a plurality of open ends, each open end being constructed to securely and directly connect to an open end of a containment pipe;

a carrier housing having a plurality of open ends constructed and arranged for positioning within the containment housing, each open end being constructed to securely and directly connect to an open end of a carrier pipe; and a plurality of restraining means, at least one restraining means located at each open end of the containment housing and being adhesively bonded to the outside surface of the carrier housing and to the inside surface of the containment housing at a location spaced away from the open ends of the carrier housing and the containment housing, for securely connecting the carrier housing to the containment housing and for restraining expansion and contraction of the carrier pipe and containment pipe.

32. A double-containment pipe system, comprising:
(1) a plurality of sections of double-containment pipe, each section of double-containment pipe including a containment pipe and a carrier pipe, the carrier pipe being positioned within the containment pipe, there being no positive restraints within the sections against expansion and contraction of the carrier pipe and containment pipe;
(2) at least one double-containment fitting, comprising:
a containment housing having a plurality of open ends, each open end being constructed to securely and directly connect to an open end of a containment pipe;
a carrier housing having a plurality of open ends constructed and arranged for positioning within the containment housing, each open end being constructed to securely and directly connect to an open end of a carrier pipe; and
a plurality of restraining means, at least one restraining means located at each open end of the containment housing and connected between the containment housing and the carrier housing, for securely connecting the carrier housing to the containment housing and for restraining expansion and contraction of the carrier pipe and containment pipe; and
(3) an end fitting for transitioning from an uncontained carrier pipe to a double-containment pipe system, the end fitting comprising:
a transition pipe having a first open end and a second open end for securely connecting the end fitting to a carrier pipe of the double-containment pipe system; and
an annular transition restraining means, securely connected to and extending from the outside surface of the transition pipe, for securely connecting to an inside surface of an open end of a containment pipe associated with the carrier pipe to which the transition pipe is connected, for sealing the annulus between the carrier pipe and the containment pipe, and for restraining expansion and contraction of the carrier pipe and containment pipe.

33. A pipe system of claim 32 in which the transition restraining means further comprises:
a sealable vent for accessing the sealed annulus between the carrier pipe and the containment pipe.

34. A double-containment pipe system, comprising:
(1) a plurality of sections of double-containment pipe, each section of double-containment pipe including a containment pipe and a carrier pipe, the carrier pipe being positioned within the containment pipe, there being no positive restraints within the sections against expansion and contraction of the carrier pipe and containment pipe;
(2) at least one double-containment fitting, comprising:
a containment housing having a plurality of open ends, each open end being constructed to securely and directly connect to an open end of a containment pipe;
a carrier housing having a plurality of open ends constructed and arranged for positioning within the containment housing, each open end being constructed to securely and directly connect to an open end of a carrier pipe; and
a plurality of restraining means, at least one restraining means located at each open end of the containment housing and connected between the containment housing and the carrier housing, for securely connecting the carrier housing to the containment housing and for restraining expansion and contraction of the carrier pipe and containment pipe; and
(3) an end fitting for transitioning from an uncontained carrier pipe to a double-containment pipe system, the end fitting comprising:
a transition pipe having a first open end and a second open end for securely connecting the end fitting to an open end of a carrier housing of the double-containment pipe system; and
an annular transition restraining means, securely connected to and extending from the outside surface of the transition pipe, for securely connecting to an inside surface of an open end of a containment housing associated with the carrier housing to which the transition pipe is connected, for sealing the annulus between the carrier housing and the containment housing, and for transferring end loadings from the carrier housing to the containment housing.

35. A pipe system of claim 34 in which the transition restraining means further comprises:
a sealable vent for accessing the sealed annuls between the carrier housing and the containment housing.

* * * * *

UNITED STATES PATENT AND TRADEMARK OFFICE
CERTIFICATE OF CORRECTION

PATENT NO. : 5,186,502

DATED : February 16, 1993

INVENTOR(S) : Carl E. Martin

It is certified that error appears in the above-identified patent and that said Letters Patent is hereby corrected as shown below:

Title Page: item [57]
IN THE ABSTRACT:

Line 7, change "pipe. the" to --pipe. The--.

Line 7, change "plulrality" to --plurality--.

Col. 7, line 39, change "pip" to --pipe--.

Col. 10, line 39, change "container" to --contained--.

Col. 12, line 61, change "would" to --wound--.

Col. 12, line 61, change "567" to --56--.

Col. 18, claim 28, line 3, change "i" to --in--.

Signed and Sealed this

Thirtieth Day of November, 1993

Attest:

BRUCE LEHMAN

*Attesting Officer*     *Commissioner of Patents and Trademarks*

REEXAMINATION CERTIFICATE (2375th)

United States Patent [19]

Martin

[11] B1 5,186,502

[45] Certificate Issued  Aug. 30, 1994

[54] DOUBLE-CONTAINMENT PIPE FITTINGS AND SYSTEM

[75] Inventor: Carl E. Martin, Sand Springs, Okla.

[73] Assignee: Fibercast Company, Sand Springs, Okla.

Reexamination Request:
No. 90/003,325, Feb. 7, 1994

Reexamination Certificate for:
Patent No.: 5,186,502
Issued: Feb. 16, 1993
Appl. No.: 625,837
Filed: Dec. 11, 1990

Certificate of Correction issued Nov. 30, 1993.

[51] Int. Cl.$^5$ .................................. F16L 39/00
[52] U.S. Cl. ........................... 285/133.1; 285/138; 285/179; 138/112; 138/113
[58] Field of Search .............. 285/133.1, 138, 178; 138/112, 113

[56] References Cited

U.S. PATENT DOCUMENTS

| | | |
|---|---|---|
| 130,216 | 8/1872 | Goodale . |
| 447,275 | 2/1891 | Berrenberg . |
| 578,474 | 3/1897 | Thompson et al. . |
| 797,911 | 8/1905 | Perry . |
| 887,850 | 5/1908 | Rollins . |
| 1,134,930 | 4/1915 | Theriot . |
| 1,140,633 | 5/1915 | Trucano . |
| 1,371,632 | 3/1921 | Latimer . |
| 1,383,680 | 7/1921 | Waldorf . |
| 1,446,789 | 2/1923 | Dodd . |
| 1,485,512 | 3/1924 | LeCocq et al. . |
| 1,737,161 | 11/1929 | Jupp . |
| 1,853,736 | 4/1932 | Lawrence . |
| 1,886,427 | 11/1932 | Riggins . |
| 1,909,075 | 5/1933 | Ricker et al. . |
| 1,931,465 | 10/1933 | Gysling . |
| 2,031,849 | 2/1936 | O'Leary . |
| 2,401,974 | 6/1946 | Siebels . |
| 2,475,635 | 7/1949 | Parsons . |
| 2,478,684 | 8/1949 | Brooks . |
| 2,613,166 | 10/1952 | Gronemeyer . |
| 2,650,112 | 8/1953 | Kinkead . |
| 2,696,835 | 12/1954 | Kaiser . |
| 2,707,095 | 4/1955 | Parsons et al. . |
| 2,745,683 | 5/1956 | Nihlen . |
| 2,895,512 | 7/1959 | Forsyth et al. . |
| 3,065,807 | 11/1962 | Wells . |

(List continued on next page.)

FOREIGN PATENT DOCUMENTS

| | | |
|---|---|---|
| 3439417 | 4/1986 | Fed. Rep. of Germany . |
| 508388 | 3/1957 | Italy . |
| 410196 | 5/1934 | United Kingdom . |
| 9004736 | 5/1990 | World Int. Prop. O. . |

OTHER PUBLICATIONS

*Military Standardization Handbook "Plastics'-'-MIL-HDBK-700[MR]*, Nov. 1, 1985, pp. 66-68, FIG. 555, 90° Elbow Short Radius.

*Primary Examiner*—Randolph A. Reese

[57] ABSTRACT

A double-containment pipe fitting and system for joining sections of double-containment pipe includes an outer containment housing, an inner carrier housing, and a plurality of restraining devices. The containment housing has a plurality of open ends. Each open end is constructed to securely connect to an open end of a containment pipe, the carrier housing has a plurallity of open ends constructed and arranged for positioning within the containment housing. Each open end of the carrier housing is constructed to securely connect to an open end of a carrier pipe. One restraining device is provided for each open end of the containment housing. The restraining device securely fastens the carrier housing to the containment housing and thereby restrains expansion and contraction of the carrier pipe and containment pipe. The carrier pipe and containment pipe are otherwise unrestrained against expansion and contraction. The double containment pipe fitting and system is suitable for use with filament wound pipe and other large diameter pipe.

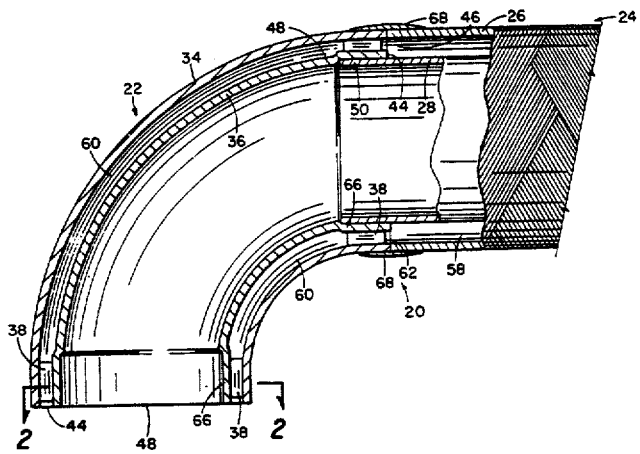

U.S. PATENT DOCUMENTS

| | | |
|---|---|---|
| 3,143,146 | 8/1964 | Kennedy . |
| 3,208,539 | 9/1965 | Henderson . |
| 3,489,438 | 1/1970 | McClure . |
| 3,503,635 | 3/1970 | Cheatwood . |
| 3,546,356 | 12/1970 | Graybill . |
| 3,718,161 | 2/1973 | Woodson . |
| 3,721,270 | 3/1973 | Wittgenstein . |
| 3,860,269 | 1/1975 | Horton . |
| 3,980,112 | 9/1976 | Basham . |
| 4,018,250 | 4/1977 | Waters . |
| 4,072,328 | 2/1978 | Elliott . |
| 4,723,441 | 2/1988 | Sweeney . |
| 4,779,652 | 10/1988 | Sweeney . |
| 4,786,088 | 11/1988 | Ziu . |
| 4,886,305 | 12/1989 | Martin . |
| 4,930,544 | 6/1990 | Ziu . |

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-35 is confirmed.

* * * * *